United States Patent
DeLuca et al.

(10) Patent No.: US 7,031,981 B1
(45) Date of Patent: Apr. 18, 2006

(54) TOOL SUPPORTING SYSTEM LOG FILE REPORTING

(75) Inventors: Anthony J. DeLuca, Vadnais Heights, MN (US); Richard J. Chenery, Jr., Forest Lake, MN (US)

(73) Assignee: Unisys Corporation, Blue Bell, PA (US)

( * ) Notice: Subject to any disclaimer, the term of this patent is extended or adjusted under 35 U.S.C. 154(b) by 474 days.

(21) Appl. No.: 10/027,081

(22) Filed: Dec. 21, 2001

(51) Int. Cl.
 *G06F 17/30* (2006.01)
(52) U.S. Cl. .................................. 707/104.1
(58) Field of Classification Search .............. 707/1–10, 707/102, 104.1, 200, 201, 202, 204, 100; 715/764, 853; 705/1, 10, 35
See application file for complete search history.

(56) References Cited

U.S. PATENT DOCUMENTS

| | | | | |
|---|---|---|---|---|
| 5,664,182 A | * | 9/1997 | Nierenberg et al. | 707/102 |
| 5,721,903 A | * | 2/1998 | Anand et al. | 707/102 |
| 5,832,508 A | * | 11/1998 | Sherman et al. | 707/200 |
| 5,892,917 A | * | 4/1999 | Myerson | 709/224 |
| 6,292,801 B1 | * | 9/2001 | Campbell et al. | 707/10 |
| 6,341,286 B1 | * | 1/2002 | Kawano | 707/101 |
| 6,377,955 B1 | * | 4/2002 | Hartmann et al. | 707/104.1 |
| 6,385,609 B1 | * | 5/2002 | Barshefsky et al. | 707/3 |
| 6,393,422 B1 | * | 5/2002 | Wone | 707/10 |
| 6,516,324 B1 | * | 2/2003 | Jones et al. | 707/104.1 |
| 6,643,635 B1 | * | 11/2003 | Nwabueze | 707/200 |
| 6,647,400 B1 | * | 11/2003 | Moran | 707/205 |
| 6,714,979 B1 | * | 3/2004 | Brandt et al. | 707/10 |
| 2001/0032094 A1 | * | 10/2001 | Ghosh et al. | 705/1 |
| 2002/0023040 A1 | * | 2/2002 | Gilman et al. | 705/37 |
| 2002/0070953 A1 | * | 6/2002 | Barg et al. | 345/700 |
| 2002/0111887 A1 | * | 8/2002 | McFarlane et al. | 707/104.1 |
| 2003/0040936 A1 | * | 2/2003 | Nader et al. | 705/1 |
| 2003/0065662 A1 | * | 4/2003 | Cosic | 707/9 |
| 2003/0208397 A1 | * | 11/2003 | VanDusen | 705/14 |

* cited by examiner

*Primary Examiner*—Jean M. Corrielus
*Assistant Examiner*—Anh Ly
(74) *Attorney, Agent, or Firm*—Charles A. Johnson; Mark T. Starr; Crawford Maunu PLLC

(57) ABSTRACT

Method and system for report selection in a system that provides a plurality of reports. A database is populated with selected data elements of a plurality of data types, and a database content table is created that indicates the data types of the data elements present in the database. For each report, a report identifier and an associated set of report requirements are established in a report table. Each set of report requirements identifies a set of data types required for the associated report. A set of report identifiers is output for the data types of data elements in the database that satisfy the associated sets of report requirements.

24 Claims, 6 Drawing Sheets

UNISYS
System Log Analysis and Reports

Select Start Time Interval
Select End Time Interval

Tape Channel Program Error Report

| Database Creation Date & Time | Create Date | | Log Start Date & Time | Log Start Date-Time |
|---|---|---|---|---|
| Database Name | System Log File Name | | Log End Date & Time | Log End Date-Time |
| Database Description | System Log Description | | | |

| Device Name | Reel # Pack ID | Time of last Error | RUD ID | User Function Code | RD | WRT | Other | References Since Last Error |
|---|---|---|---|---|---|---|---|---|
| Group #1 Name | | | | | | | | |
| | Reel Number | Audit Timestamp Date | RUD ID | Code | errors | errors | errors | erences Since Last Error |
| TOTALS: | | ERRORS | | | rors | rrors | rrors | Avges Since Last Error |

Printed on Print Date at Print Time

FIG. 5

TOOL SUPPORTING SYSTEM LOG FILE REPORTING

FIELD OF THE INVENTION

The present invention generally relates to tools that support performance analysis of computer systems, and more particularly to support of analyzing data logged in a system log file.

BACKGROUND OF THE INVENTION

Many computer systems host system software that logs various performance-related data to a log file. The log data include, for example, the number processor cycles consumed by a program, the quantity of system memory occupied and used by the program, input and output activity associated with the program and a variety of other information. In one example system, log data records are sequentially written to the log file, with each entry pertaining to a particular program and including a timestamp that indicates the time at which the entry was written to the log file.

One approach for accessing the system log file data is with a command-based user interface. With a command interface, a user can generate reports of log file data using scripts of commands that are tailored to produce log data reports that meet the user's needs. The command-based approach requires the user to understand the syntax and functionality of the command language. For experienced users, the command-based approach may be acceptable. However, the trend toward graphical user interfaces that are intuitive may makes the command-based approach seem difficult for new users.

A method and apparatus that addresses the aforementioned problems, as well as other related problems, are therefore desirable.

SUMMARY OF THE INVENTION

In various embodiments, the present invention aids in report selection in a system that provides a plurality of reports. A database is populated with selected data elements of a plurality of data types, and a database content table is created that indicates the data types of the data elements present in the database. For each report, a report identifier and an associated set of report requirements are established in a report table. Each set of report requirements identifies a set of data types required for the associated report. A set of report identifiers is output for the data types of data elements in the database that satisfy the associated sets of report requirements.

Various example embodiments are set forth in the Detailed Description and claims which follow.

BRIEF DESCRIPTION OF THE DRAWINGS

Other aspects and advantages of the invention will become apparent upon review of the Detailed Description and upon reference to the drawings in which:

FIG. 5 is a screen dump of an example report template; and

DETAILED DESCRIPTION

To eliminate the burden of having to learn a command language in order to report log file data, the system described below extracts log file data from a system log file and stores the log file data in a relational database. A graphical user interface (GUI) makes the data extraction process easy to learn. A GUI is also provided for generating reports from the data in the database.

In the example system for which the reporting mechanism is implemented, there are hundreds of log record types and subtypes. In addition there are scores of reports available, many requiring different subsets of log record types and subtypes. Therefore, merely listing the names of reports may overwhelm a user. In addition, the data available in a log file database may not satisfy the data requirements of many of the reports.

To make the reporting process easier for the user, in various embodiments the present invention displays for the user only the names of those reports for which log data in the database satisfy the data requirements of the reports. This process reduces the number of report names presented to the user, thereby potentially saving the user's time.

Figure 1:
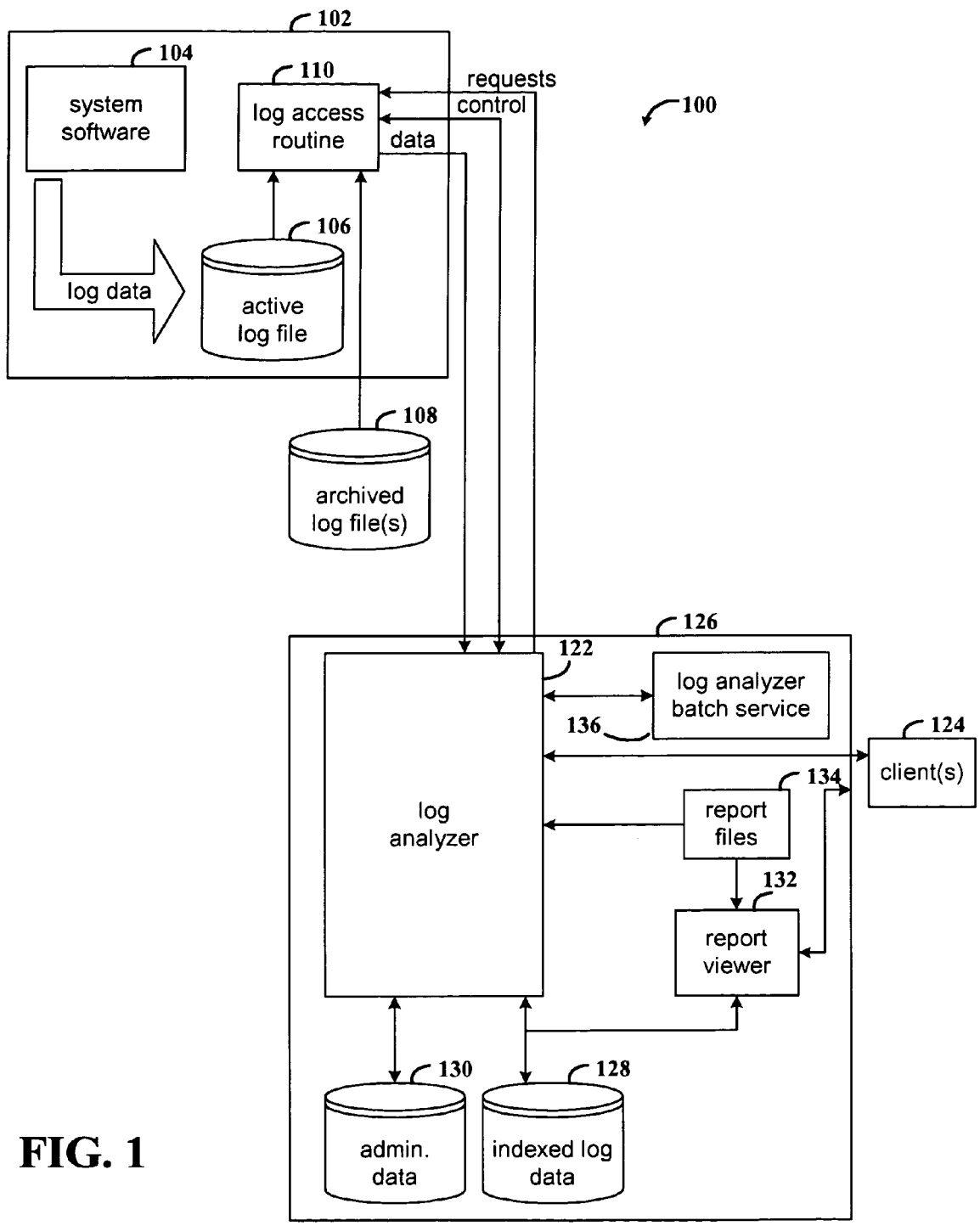
FIG. 1 is a functional block diagram of a computing arrangement for processing a system log file.

FIG. 1 is a functional block diagram of a computing arrangement for processing a system log file in accordance with one embodiment of the invention. Data processing system 102 hosts system software 104 that writes log data to an active log file 106. Periodically, or under administrator controls, the active log file is archived with other archived log files 108.

In one embodiment, the log file data describe operational characteristics of the data processing system 102 and the programs executing on the system. For example, the log data include the system time and date, system performance characteristics, and program execution characteristics such as processor usage, input/output activity, and storage usage. The log data are sequentially stored as records of binary data and include timestamps that indicate the respective times at which the records were written. Different records with different information are stored for different types of log data. For example, one type of log record is created for program log entries, and another type of log record is created for system performance characteristics. Each type of log record is identified by a type code in the log record.

Via log access routine 110 and log analyzer 122, the log data are accessible to users at client systems 124. The log analyzer, associated modules, and associated data are hosted by a data processing system 126, which is coupled to system 102 via a local or wide area network, for example. The log analyzer initiates extraction of selected data from either the active log file 106 or an archived log file 108 in response to a user-entered directive at client 124. Client 124 is the means through which a user interacts with log analyzer 122. In one embodiment, the client is software hosted by system 122, and in an alternative embodiment, the client is software hosted on another data processing system.

The extraction request is transmitted from log analyzer 122 to log access routine 110. The extraction request specifies, for example, types of records to read from the log file and a time interval that controls which records are read by the timestamps of the records. In response to an extraction request, the log access routine reads data from the specified log file (active or archived) and returns the data to the log analyzer. Various control data are exchanged between the log analyzer and the log access routine in processing the log data. For example, in one embodiment, the log analyzer opens a Telnet connection to system 102 and transfers a parameter file to the log access routine via FTP. The log access routine transfers the extracted data to the log analyzer via FTP.

The log analyzer uses meta-data contained in administrative database 130 to convert the log data from the format of the log file to a format suitable for database storage. The log analyzer then creates an indexed database 128 of the log data. Each record extracted from the log file is assigned a unique identifier. The identifier, along with standard header information from each record is inserted into a single master database table. The table is then used to determine the total number of log records retrieved, the types of the log records, and other characteristics. The log record identifiers are also placed in a log-type specific table for each record. The log-type specific table can be used to link back to the master table that contains the header information. The header information includes, for example, the log record type, a subtype, a version of a loc record type, and the time that the record was written. One field that is already contained in each log file record is also an identifying field, but it is unique to a system thread meaning it could match multiple log entries. This field is also used for linking of multiple records from multiple tables in order to view all log file activity associated with a particular thread.

Once the log data are extracted and indexed, reports can be generated for viewing by users. A user at client 124 interacts with report viewer 132 in generating a report. Report files 134 define report templates that specify the type of log data and format for various reports. In one embodiment, Seagate Crystal Reports software is used in preparing the templates and generating the reports. The report viewer is a set of classes and functions made available by Seagate Crystal Reports software. A DLL containing these classes and functions is referenced by the log analyzer and provides an interface to a report template and the capability to connect the indexed log data to the template. The generated report is displayed in a window, for example.

In the example embodiment, log data can be extracted on demand or as a batch service. Log analyzer batch service 136 supports time delayed extraction of the log data.

The computing arrangement allows users to selectively extract from a system log file data that are of interest and store and index the log data in a database. Once the log data are indexed and stored, various reports can be generated by users without requiring further time-consuming access to the system log file.

Figure 2:
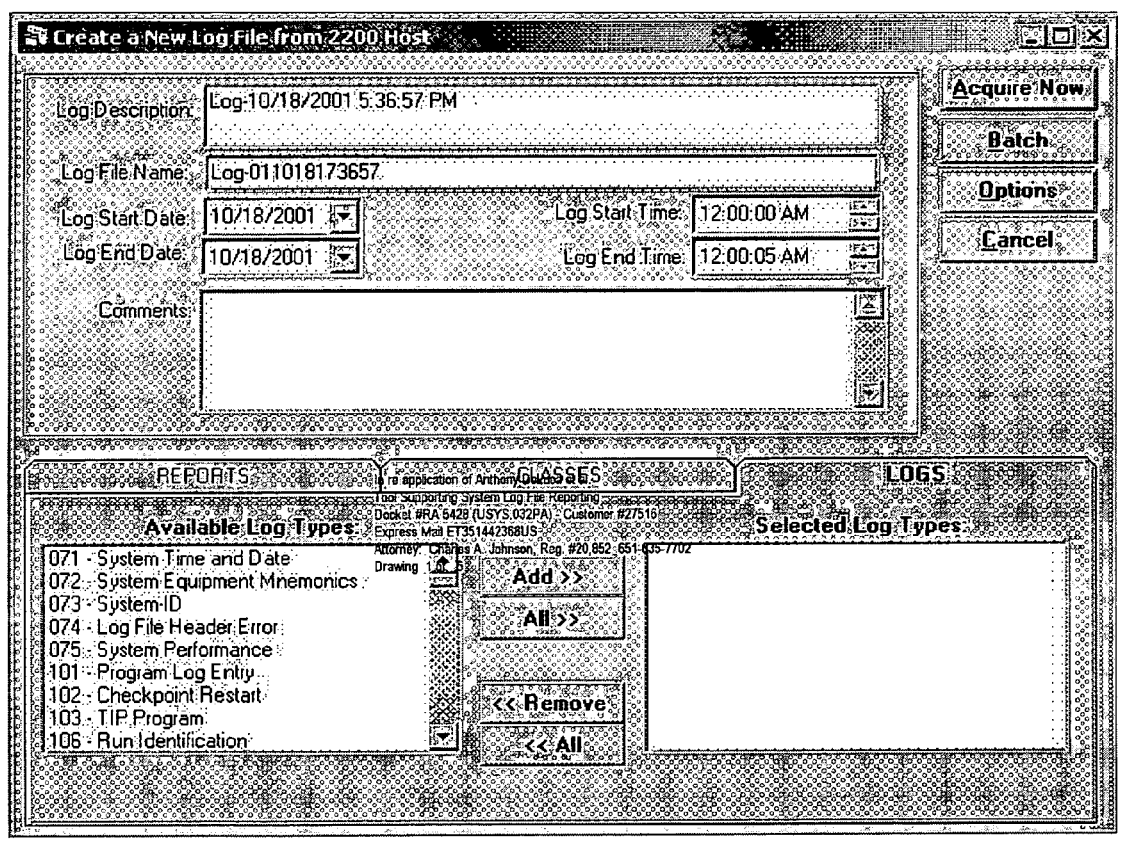
FIG. 2 illustrates an example user-interface screen for processing a log file.

FIG. 2 illustrates an example user-interface screen for processing a log file in accordance with another embodiment of the invention. The user-interface screen is shown to illustrate the type of information used to create a database of log data. The Log Description field allows the user to associate with the database of log data a short textual description of the log data contained therein, and the Log File Name field allows the user to name the database of log data. The Options button includes fields that allow a user to specify an archived log file and also to specify appending the log data to the current log indexed log data 128. The user can alternatively specify creation of a new database.

The Log Start Date, Log End Date, Log Start Time, and Log End Time fields allow the user to specify the range of log file records that are to be extracted from the log file. Similarly, under the Logs tab the entries in the Available Log Types list allow the user to further specify the criteria by which log records are extracted from the log file.

The Acquire Now button initiates immediate extraction of log data from the log file, and the Batch button registers with the log analyzer batch service 136 for extraction of the log data at a user-specified time. It will be appreciated that the specified Available Log Types are those associated with the 2200 series data processing systems from Unisys. Different systems will have other system-specific types and formats of log data.

The CLASSES tab is an alternative way to specify log record types. The types of log records are categorized into different classes. Selection of a class of log record types results in extraction of all the log records of all the types that are members of the selected class. The REPORTS tab enables selection of reports. Each report may involve a number of log record types.

Figure 3:
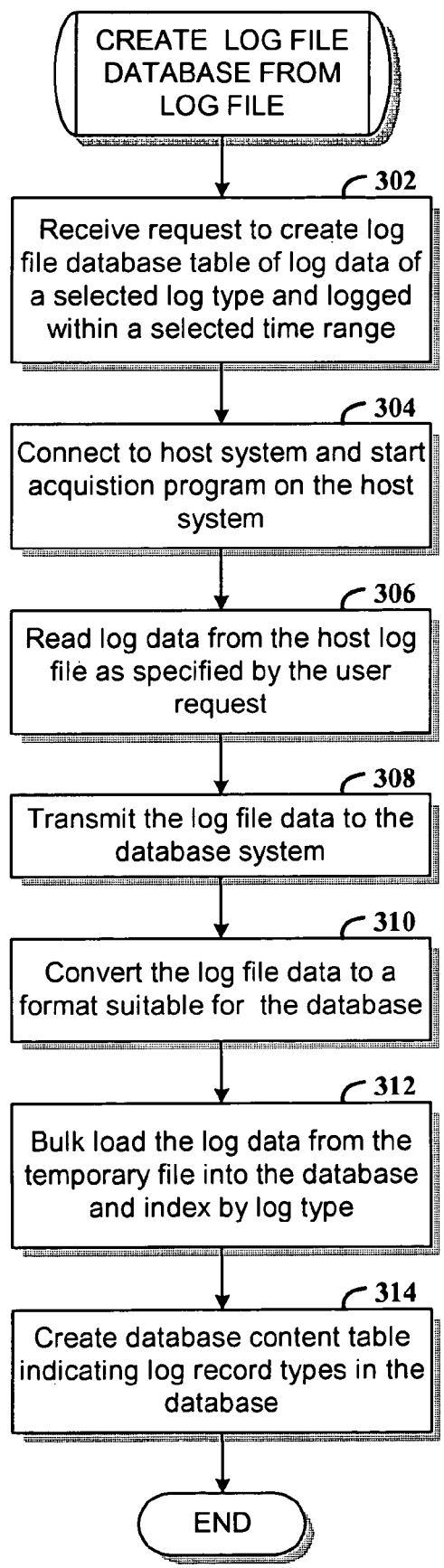
FIG. 3 is a flowchart of an example process for creating a database table of selected log data from a log file.

FIG. 3 is a flowchart of an example process for creating a database table of selected log data from a log file. The log analyzer receives from a user a request to create a database of log data (step 302). The request includes, for example, a time and date range, along with the type(s) of log data to read from the log file. In response to the request, the log analyzer connects to the log access routine of the host system and transmits the request (step 304).

The log access routine reads log data from the log file according to the selection criteria in the request (step 306). In one embodiment, the extracted log data are accumulated in a file to be transferred to the log analyzer. The extracted log data are transmitted to the log analyzer (step 308).

The log analyzer converts the data from the log file format to a format suitable for loading in the database (step 310). In one embodiment, for example, the log data are converted to a file(s) of comma separated values ("CSV file"), with log records separated by a carriage return. The values in the CSV file are textual data. The CSV format is useful for quickly loading the log data into the database (step 312). In one embodiment, the text file with the specified formatting is provided to an SQL BULK INSERT command. The field and record delimiters are input parameters to the INSERT command. It will be appreciated that other delimiters may be used in other embodiments.

The conversion of the log data from the format of the log file to the format suitable for the database uses meta-data in the administrative database 130. The administrative database includes a single administrative table that identifies each field of each table that needs to be converted. A separate table is created for each type of log record. The key fields in the administrative table are the table name, starting location (relative to the first word/bit of the log record), length of the log record, and type of the log record. From this information, the data in the log file is located, converted to textual format, and written to a CSV file. There is a separate CSV file for each table. The data from the CSV file are then inserted in the proper table of the database 128.

Once the log data are available in the indexed database, various reports can be generated at users' requests. In one embodiment, the report templates defined by report files 134 are user-selectable and specify the type of log data needed for the report along with a report layout.

At step 314 a database content table is created that indicates which log record types are present in the database. Table 1 illustrates an example log-type table inside a log file database. The log-type table identifies the log types of the log records that are available in a log file database.

TABLE 1

| User Entry Info ID | Log Type | Log Sub Type | Log Description |
|---|---|---|---|
| 1 | 71 | | System Time and Date Log |
| 2 | 72 | | System Equipment Mnemonics Log |
| 3 | 72 | | System Equipment Mnemonics Data |
| 4 | 72 | | System Equipment Mnemonics Range Descriptor |
| 5 | 73 | | System-ID Log |
| 6 | 74 | | Log File Header Error Log |
| 7 | 75 | | System Performance Log |
| 8 | 101 | 1 | Program Initiation |
| 9 | 101 | 2 | Program Continuation |
| 10 | 101 | 3 | Program Termination |
| 11 | 102 | 1 | Checkpoint Initiation |
| 12 | 102 | 2 | Restart Initiation |
| 13 | 102 | 3 | Checkpoint Termination |
| 14 | 102 | 4 | Restart Termination |
| 15 | 103 | 1 | TIP Program - 1. A multiple INITAL program has finished processing a message and has requested another. 2 A program has been restarted after processing a message. 3. A program has been stuck in memory after processing a message. |
| 16 | 103 | 2 | TIP program termination, the program has been removed from main storage after processing a message. |

Even though only one log file database is illustrated, in another embodiment users have the option of creating multiple log file databases. An associated database content table is created for each log file database.

Figure 4:
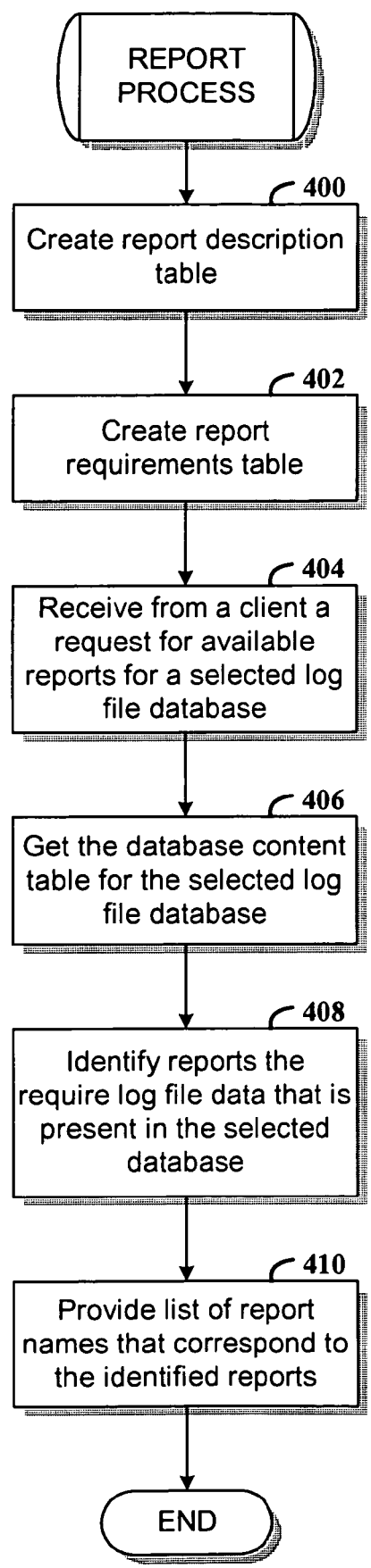
FIG. 4 is a flowchart of an example process for assisting in report selection.

FIG. 4 is a flowchart of an example process for assisting in report selection, and FIG. 5 is a screen dump of an example report template. For the reports that are defined by report templates in report files 134, the log analyzer creates a report description table in administrative database 130 (step 400). Table 2 below illustrates an example report description table.

TABLE 2

| Rep. ID | Report Name | Report Description | Report File Name | Report Category | Report Type |
|---|---|---|---|---|---|
| 3 | Log Entry Descriptor | Log Entry Descriptor Basic Report | LogDescriptor.rpt | General | Basic |
| 4 | System Log Type 071 | System Time and Date | LogType-071.rpt | General | Basic |
| 5 | System Log Type 072 | System Equipment Mnemonics | LogType-072.rpt | General | Basic |
| 6 | System Log Type 073 | System ID | LogType-073.rpt | General | Basic |
| 7 | System Log Type 074 | Log File Header Error | LogType-074.rpt | General | Basic |
| 8 | System Log Type 075 | System Performance | LogType-075.rpt | General | Basic |
| 9 | Detailed Console Log Report | Detailed Console Log Report | | None | Detailed |
| 10 | Detailed Qlink Report | Detailed Qlink Report | | None | Detailed |
| 11 | Tape File Summary Report | Tape File Summary Report | Tape File Summary Report.rpt | Operations | Detailed |
| 12 | System Log Type 101 | Program Log Entry | LogType-101.rpt | General | Basic |
| 13 | Device Usage Report | Measures use of peripheral devices: 107, 203, 301, 302, 403, 405 | | Facilities | Detailed |
| 14 | Equipment Usage Report | Equipment types that generated the log file: 108, 110 | | Debug | Detailed |
| 15 | Run Activity Trace Report | Analyze all run activity on the system: 101, 106, 107 | Run-Program Activity Trace Report.rpt | Debug | Detailed |
| 17 | File List | Detail of all cataloged files used: 107, 403, 405 | | None-File | Detailed |
| 18 | ROLOUT report | Detail of all ROLOUT activity: 101, 106, 107, 302, 403, 405 | Rolout Report.rpt | Operations | Detailed |
| 19 | ROLBAK Report | Detail of all ROLBAK activity: 101, 106, 107, 302, 403, 405 | Rolbak Report.rpt | Operations | Detailed |
| 20 | File Access Report | All files accessed with runid and time accessed: 106, 107, 403 | File Access Report.rpt | Operations | Detailed |

TABLE 2-continued

| Rep. ID | Report Name | Report Description | Report File Name | Report Category | Report Type |
|---|---|---|---|---|---|
| 21 | File Rename Report | Detail of all cataloged files that had name changes: 408 | File Rename Report.rpt | Operations | Detailed |

The report description table includes for each report template a report identifier, a report name, a textual description of the report, the name of the template file that defines the report, a category for classifying reports, a type field for classifying the report according to level of detail provided by the report, and other implementation-specific information.

The log analyzer also creates a report requirements table that specifies the log record types that are required for the different reports (step 402). Table 3 below illustrates a subset of entries in an example report requirements table for the reports described in Table 2.

TABLE 3

| RepLog ID | Report ID | Log Type ID |
|---|---|---|
| 5 | 12 | 7 |
| 6 | 12 | 8 |
| 7 | 12 | 9 |
| 9 | 6 | 4 |
| 10 | 7 | 5 |
| 11 | 8 | 6 |
| 16 | 68 | 7 |

TABLE 3-continued

| RepLog ID | Report ID | Log Type ID |
|---|---|---|
| 17 | 68 | 8 |
| 18 | 68 | 9 |
| 19 | 80 | 7 |
| 20 | 80 | 8 |

The RepLog ID field is used to uniquely identify each row in the table. The report ID is the report identifier from Table 2, and the Log Type ID field identifies the log record type required for the report (indexes Table 4 below).

Table 4 describes the types of log records. Table 3 identifies the log type identifiers that are required for a report, Table 4 indicates the log types associated with the log type identifiers, and Table 1 indicates the log types that are present in the database.

TABLE 4

| Log Type ID | Log Type | Log Sub Type | Log Name | Log Table Name | Log Description | Log Field Count | Sub Table |
|---|---|---|---|---|---|---|---|
| 1 | 71 | | Log File Header | 071 - System Time and Date | System Time and Date Log | 9 | NO |
| 2 | 72 | | Log File Header | 072 - System Equipment Mnemonics | System Equipment Mnemonics Log | 4 | NO |
| 3 | 72 | | Log File Header | 072 - System Equipment Mnemonics Data | System Equipment Mnemonics Data | 3 | YES |
| 229 | 72 | | Log File Header | 072 - System Equipment Mnemonics Range Descriptor | System Equipment Mnemonics Range Descriptor | 5 | YES |
| 4 | 73 | | Log File Header | 073 - System-ID | System-ID Log | 13 | NO |
| 5 | 74 | | Log File Header | 074 - Log File Header Error | Log File Header Error Log | 4 | NO |
| 6 | 75 | | Log File Header | 075 - System Performance | System Performance Log | 4 | NO |
| 7 | 101 | 1 | Accounting Log Entry | 101 - Program Log Entry | Program Initiation | 79 | NO |
| 8 | 101 | 2 | Accounting Log Entry | 101 - Program Log Entry | Program Continuation | 79 | NO |
| 9 | 101 | 3 | Accounting Log Entry | 101 - Program Log Entry | Program Termination | 79 | NO |

TABLE 4-continued

| Log Type ID | Log Type | Log Sub Type | Log Name | Log Table Name | Log Description | Log Field Count | Sub Table |
|---|---|---|---|---|---|---|---|
| 10 | 102 | 1 | Accounting | 102 - Checkpoint Restart | Checkpoint Initiation | 37 | NO |
| 11 | 102 | 2 | Accounting | 102 - Checkpoint Restart | Restart Initiation | 37 | NO |
| 12 | 102 | 3 | Accounting | 102 - Checkpoint Restart | Checkpoint Termination | 37 | NO |

After a user has created a log file database (FIG. 3), the user has the option of displaying various reports of the log data. For example, to initiate reporting functions, the user selects the REPORTS tab of the interface screen of FIG. 2, effectively providing a request to the log analyzer to provide a list of available reports (step 404).

Figure 6:
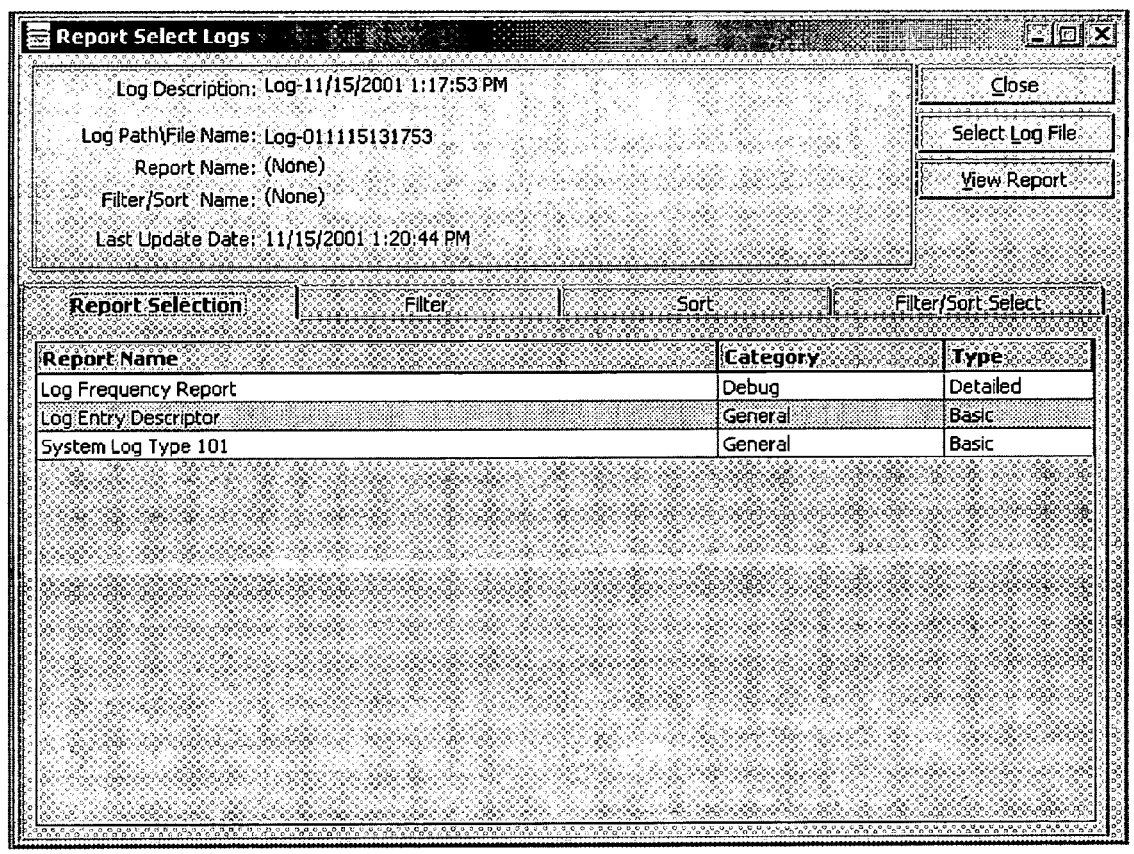
FIG. 6 is a screen dump of an example listing of report names.

To fulfill the request, the log analyzer gets the database content table (Table 1) from the administrative database 130 (step 406). The log analyzer then identifies (step 408) which reports have report requirements that are satisfied by the log file database. That is, for each Report ID in the report description table, the necessary log type IDs are obtained from the report requirements table. If for a report all the log type IDs are present in the database content table, the associated report name is one of the report names in the list displayed for the user (step 410). FIG. 6 is a screen dump in which report names are displayed for a log file having only log records of log record type 101. Only those reports that are supported by this log record type are shown.

In one embodiment, the report names displayed to the user are user selectable. In response to selection of a report name, report viewer 132 reads the necessary log file data from database 128 and displays the data to the user.

Accordingly, the present invention provides, among other aspects, a method and apparatus for a tool that support log file reporting. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for report selection in a system that provides a plurality of reports, comprising:
   populating a database with selected data elements of a plurality of data types;
   creating a database content table that indicates the data types of the data elements present in the database;
   establishing a report table containing for each report a report identifier and an associated set of report requirements, each set of report requirements identifying a set of data types required for the associated report;
   determining for each report identifier whether the data types of the data elements present in the database satisfy the associated set of requirements; and
   outputting a set of report identifiers for which the data types of data elements in the database satisfy the associated sets of report requirements.

2. The method of claim 1, further comprising:
   creating a report description table that associates report names with the report identifiers; and
   displaying a list of report names that correspond to the set of report identifiers.

3. The method of claim 2, wherein the list of report names displayed are selectable and linked to respective report functions that generate report data in accordance with predefined formats.

4. The method of claim 3, further comprising reading the selected data elements from a sequential data file prior to populating the database.

5. A computer-implemented method for selection of reports of log data generated by software executing on a host data processing system, wherein the log data are stored by the host system in a sequential log file of log records of different log record types, the method comprising:
   establishing a report table containing for each report a report identifier and an associated set of report requirements, each set of report requirements including a set of log-record-type identifiers indicating which of the log record types contain log data required for the associated report;
   reading selected log records from the log file;
   storing log data from the selected log records in a relational log-data database;
   creating a database content table that indicates the log record types of the selected log records;
   determining for each report identifier whether the data types of the data elements present in the database satisfy the associated set of requirements; and
   outputting a set of report identifiers of reports for which the log data in the database content data table satisfies the set of report requirements of associated report definitions.

6. The method of claim 5, further comprising for each log record type of the selected log records, storing log data from the selected log records of the log record type in a respective log data table.

7. The method of claim 6, further comprising:
   reading a plurality of sets of selected log records from the log file;
   storing log data from the plurality of sets of selected log records in respective relational log-data databases;
   creating respective database content tables for the respective relational log-data databases.

8. The method of claim 5, further comprising:
   reading a plurality of sets of selected log records from the log file;
   storing log data from the plurality of sets of selected log records in respective relational log-data databases;

creating respective database content tables for the respective relational log-data databases.

9. The method of claim 8, further comprising:
creating a report description table that associates report names with the report identifiers; and
displaying a list of report names that correspond to the set of report identifiers.

10. The method of claim 9, wherein the list of report names displayed are selectable and linked to respective report functions that generate report data in accordance with predefined formats.

11. The method of claim 5, further comprising:
creating a report description table that associates report names with the report identifiers; and
displaying a list of report names that correspond to the set of report identifiers.

12. The method of claim 11, wherein the list of report names displayed are selectable and linked to respective report functions that generate report data in accordance with predefined formats.

13. A computer-implemented method for processing log data generated by software executing on a host data processing system, wherein the log data are stored by the host system in a sequential log file of log records of different log record types, the method comprising:
reading selected log records from the log file in response to a first request that includes a first code indicating at least one user-specified log record type;
transmitting the selected log records from the host system to a second data processing system;
converting log data from the selected log records to a format suitable for storage in a relational database and storing the data of the second format in a relational database by the log record types, wherein the selected log records are converted and stored in the relational database at the second data processing system;
establishing a report table containing for each report a report identifier and an associated set of report requirements, each set of report requirements including a set of log-record-type identifiers indicating which of the log record types contain log data required for the associated report;
creating a database content table that indicates the log record types of the selected log records;
determining for each report identifier whether the data types of the data elements present in the database satisfy the associated set of requirements; and
outputting a set of report identifiers of reports for which the log data in the database content data table satisfies the set of report requirements of associated report definitions.

14. The method of claim 13, further comprising for each log record type of the selected log records, storing log data from the selected log records of the log record type in a respective log data table.

15. The method of claim 14, further comprising:
reading a plurality of sets of selected log records from the log file;
storing log data from the plurality of sets of selected log records in respective relational log-data databases;
creating respective database content tables for the respective relational log-data databases.

16. The method of claim 13, further comprising:
creating a report description table that associates report names with the report identifiers; and
displaying a list of report names that correspond to the set of report identifiers.

17. The method of claim 13, wherein the list of report names displayed are selectable and linked to respective report functions that generate report data in accordance with predefined formats.

18. An apparatus for report selection in a system that provides a plurality of reports, comprising:
means for populating a database with selected data elements of a plurality of data types;
means for creating a database content table that indicates the data types of the data elements present in the database;
means for establishing a report table containing for each report a report identifier and an associated set of report requirements, each set of report requirements identifying a set of data types required for the associated report;
means for determining for each report identifier whether the data types of the data elements present in the database satisfy the associated set of requirements; and
means for outputting a set of report identifiers for which the data types of data elements in the database satisfy the associated sets of report requirements.

19. An apparatus for selection of reports of log data generated by software executing on a host data processing system, wherein the log data are stored by the host system in a sequential log file of log records of different log record types, the method comprising:
means for establishing a report table containing for each report a report identifier and an associated set of report requirements, each set of report requirements including a set of log-record-type identifiers indicating which of the log record types contain log data required for the associated report;
means for reading selected log records from the log file;
means for storing log data from the selected log records in a relational log-data database;
means for creating a database content table that indicates the log record types of the selected log records;
determining for each report identifier whether the data types of the data elements present in the database satisfy the associated set of requirements; and
means for outputting a set of report identifiers of reports for which the log data in the database content data table satisfies the set of report requirements of associated report definitions.

20. A log data processing system, comprising:
a host data processing system configured for execution of a plurality of application programs, the host system further configured to store log data pertaining to the application programs in a sequential log file of log records of different log record types; and
a second data processing system coupled to the host system, the second system configured to initiate reading of selected log records from the log file in response to a first request that includes a first code indicating at least one user-specified log record type, convert log data from the selected log records to a format suitable for storage in a relational database, and store the data of the second format in a relational database by the log record types, wherein the second data processing system is further configured to establish a report table containing for each report a report identifier and an associated set of report requirements, each set of report requirements including a set of log-record-type identifiers indicating which of the log record types contain log data required for the associated report, create a database content table that indicates the log record types of the selected log records, determine for each report identifier whether the data types of the data elements present in the database satisfy the associated set of requirements, and output a set of report identifiers of reports for which the log data in the database content data table satisfies the set of report requirements of associated report definitions.

21. A computer-implemented method for report selection in a system that provides a plurality of reports, comprising:

storing information that indicates data types of data elements present in a database;

storing for each of a plurality of reports a set of report information, each set of report information including a report identifier and an associated set of report requirements, each set of report requirements identifying a set of data types required for the associated report;

selecting from the sets of report information, a set of report identifiers for which the data types of the data elements present in the database satisfy the set of report requirements associated with each report identifier; and outputting the selected set of report identifiers.

22. The method of claim 21, further comprising:

storing respective report names in association with the report identifiers; and displaying a list of report names that correspond to the selected set of report identifiers.

23. The method of claim 22, wherein the list of report names displayed are selectable and linked to respective report functions that generate report data in accordance with predefined formats.

24. The method of claim 23, further comprising:

reading data elements from a sequential data file; and populating the database with the data elements.

* * * * *